(12) United States Patent
Mou et al.

(10) Patent No.: US 11,946,569 B2
(45) Date of Patent: Apr. 2, 2024

(54) ACTUATING AND SENSING MODULE

(71) Applicant: Microjet Technology Co., Ltd., Hsinchu (TW)

(72) Inventors: Hao-Jan Mou, Hsinchu (TW); Shih-Chang Chen, Hsinchu (TW); Jia-Yu Liao, Hsinchu (TW); Hung-Hsin Liao, Hsinchu (TW); Chung-Wei Kao, Hsinchu (TW); Chi-Feng Huang, Hsinchu (TW); Yung-Lung Han, Hsinchu (TW); Chang-Yen Tsai, Hsinchu (TW); Wei-Ming Lee, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 564 days.

(21) Appl. No.: 17/234,123

(22) Filed: Apr. 19, 2021

(65) Prior Publication Data
US 2021/0332834 A1 Oct. 28, 2021

(30) Foreign Application Priority Data
Apr. 24, 2020 (TW) ................. 109113927

(51) Int. Cl.
*F04B 45/00* (2006.01)
*F04B 45/047* (2006.01)
*F16K 99/00* (2006.01)

(52) U.S. Cl.
CPC ........ *F16K 99/0015* (2013.01); *F04B 45/047* (2013.01)

(58) Field of Classification Search
CPC ...... F04B 45/047; F04B 43/046; F04B 49/03; F04B 49/035; F16K 99/0015; F16K 99/0048; F16K 2099/0094
See application file for complete search history.

(56) References Cited

U.S. PATENT DOCUMENTS

| 2017/0218936 A1* | 8/2017 | Chen .................... F04B 43/046 |
| 2019/0056367 A1* | 2/2019 | Mou .................. G01N 33/0031 |

(Continued)

FOREIGN PATENT DOCUMENTS

| CN | 101153826 A | 4/2008 |
| CN | 110240113 A | 9/2019 |

(Continued)

*Primary Examiner* — Kelsey E Cary
(74) *Attorney, Agent, or Firm* — Birch, Stewart, Kolasch & Birch, LLP

(57) ABSTRACT

An actuating and sensing module is disclosed and includes a bottom plate, a gas pressure sensor, a thin gas transportation device and a cover plate. The bottom plate includes a pressure relief orifice, a discharging orifice and a communication orifice. The gas pressure sensor is disposed on the bottom plate and seals the communication orifice. The thin gas transportation device is disposed on the bottom plate and seals the pressure relief orifice and the discharging orifice. The cover plate is disposed on the bottom plate and covers the gas pressure sensor and the thin gas-transportation device. The cover plate includes an intake orifice. The thin gas transportation device is driven to inhale gas through the intake orifice, the gas is then discharged through the discharging orifice by the thin gas transportation device, and a pressure change of the gas is sensed by the gas pressure sensor.

15 Claims, 19 Drawing Sheets

(56) References Cited

U.S. PATENT DOCUMENTS

2019/0056368 A1\* 2/2019 Mou .................. G08B 21/12
2019/0302073 A1\* 10/2019 Mou .................. H10N 30/88

FOREIGN PATENT DOCUMENTS

| CN | 110320320 A | 10/2019 |
| JP | 2008-537057 A | 9/2008 |
| JP | 2009-150329 A | 7/2009 |
| TW | 200949072 A | 12/2009 |
| TW | M553219 U | 12/2017 |
| TW | M581636 U | 8/2019 |

\* cited by examiner

ACTUATING AND SENSING MODULE

FIELD OF THE INVENTION

The present disclosure relates to an actuating and sensing module, and more particularly to an actuating and sensing module capable of being connected with a positive pressure load and a negative pressure loads and regulating gas transportation.

BACKGROUND OF THE INVENTION

With the rapid advancement of science and technology, the application of gas transportation device tends to be more and more diversified in the industrial applications, the biomedical applications, the healthcare, the electronic cooling and so on, even in the wearable devices that become popular recently. It is obviously that the conventional pumps gradually tend to miniaturize the structure and maximize the flow rate thereof.

The current thin gas transportation device is often used to inflate a positive pressure load or deflate a negative pressure load. However, it is difficult to regulate the inflation and deflation of the thin gas transportation device. Therefore, there is need to provide an actuating and sensing module to achieve the purposes of miniaturizing the volume thereof, simplifying the combination with a positive pressure load or a negative pressure load, and regulating the efficiency of inflation or deflation thereof.

SUMMARY OF THE INVENTION

An object of the present disclosure is to provide an actuating and sensing module. A gas fluctuation is generated with high-frequency actions of a piezoelectric plate of the claimed actuating and sensing module, and a pressure gradient is thus generated in the designed flow channel, so that the gas can be transported at a high speed. Moreover, the gas is transported from an intake end to an exhaust end with the resistance differences in the transportation direction of the flow channel Thus, the problems of large volume, difficulty in miniaturization, hard to be carried, and loud noise in the conventional gas transportation device can be solved.

In accordance with an aspect of the present disclosure, an actuating and sensing module is provided. The actuating and sensing module includes a bottom plate, a gas pressure sensor, a thin gas transportation device and a cover plate. The bottom plate includes a pressure relief orifice, a discharging orifice and a communication orifice. The gas pressure sensor is disposed on the bottom plate and seals the communication orifice. The thin gas transportation device is disposed on the bottom plate and seals the pressure relief orifice and the discharging orifice. The cover plate is disposed on the bottom plate and covers the gas pressure sensor and the thin gas-transportation device. The cover plate includes an intake orifice. The thin gas transportation device is driven to inhale gas through the intake orifice, the gas is then discharged through the discharging orifice by the thin gas transportation device, and a pressure change of the gas is sensed by the gas pressure sensor.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
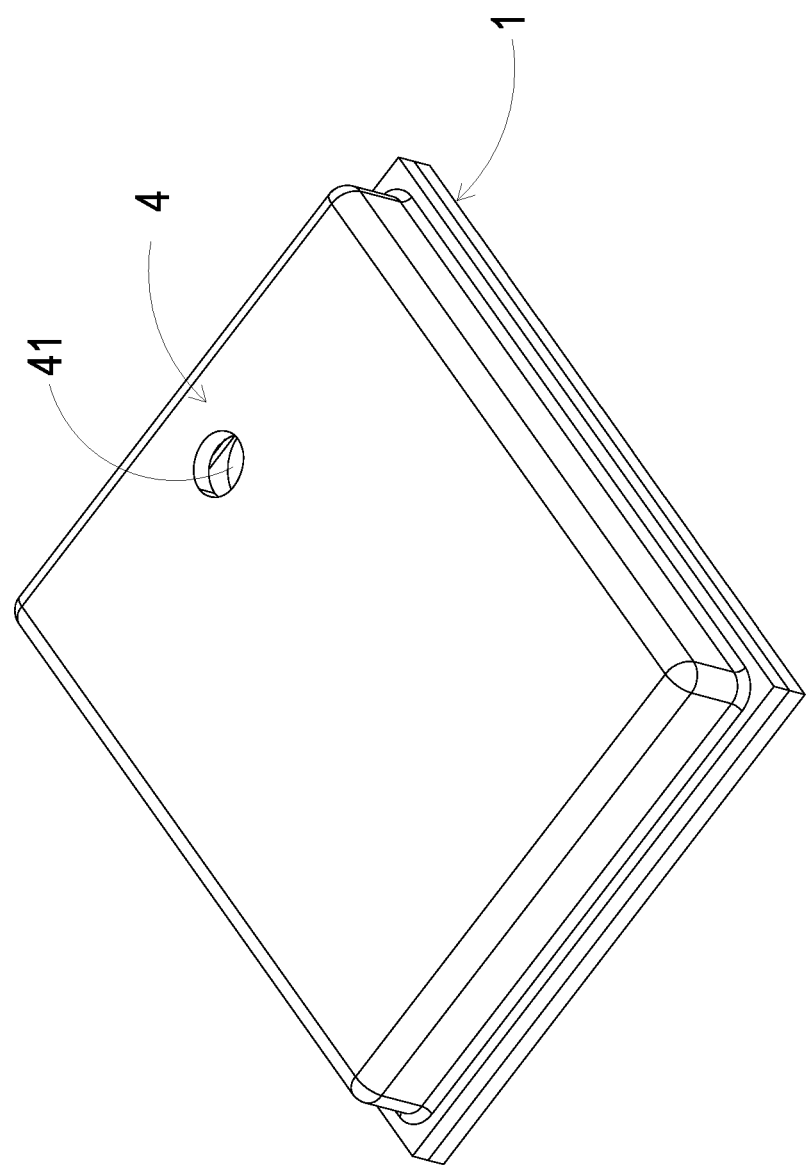
FIG. 1A is a schematic view illustrating an actuating and sensing module according to an embodiment of the present disclosure.
Figure 1B:
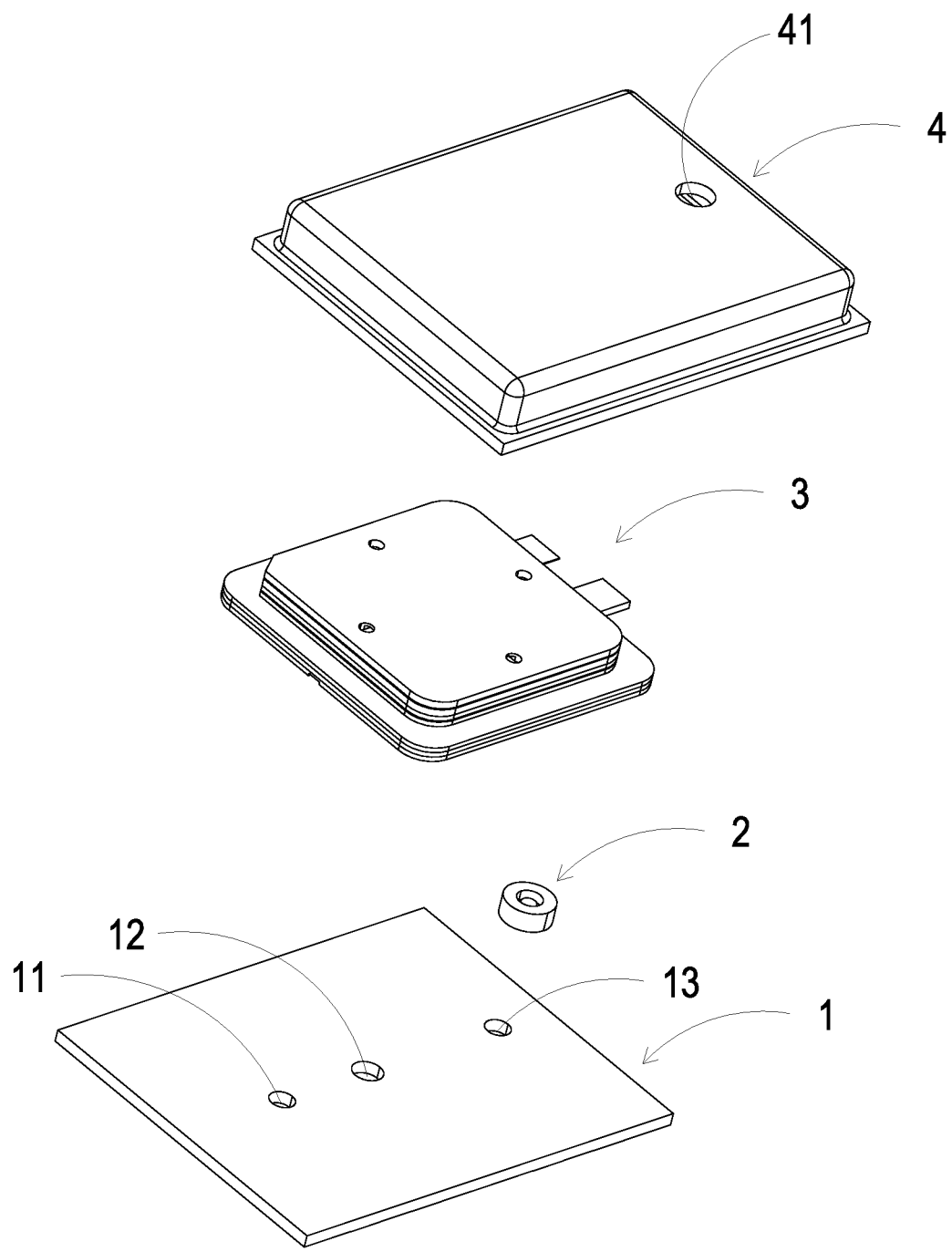
FIG. 1B is an exploded view illustrating the actuating and sensing module according to the embodiment of the present disclosure.

The present disclosure provides an actuating and sensing module 100, which is applicable for a mobile phone, a tablet computer, a wearable device or any similar mobile electronic device including components such as a microprocessor and RAM. Please refer to FIG. 1A and FIG. 1B, which are schematic views illustrating an actuating and sensing module according to an embodiment of the present disclosure. In the embodiment, the actuating and sensing module 100 includes a bottom plate 1, a gas pressure sensor 2, a thin gas transportation device 3 and a cover plate 4.

In the embodiment, the bottom plate 1 includes a pressure relief orifice 11, a discharging orifice 12 and a communication orifice 13 arranged thereon. The gas pressure sensor 2 is disposed on the bottom plate 1 and seals the communication orifice 13. The thin gas transportation device 3 is disposed on the bottom plate 1 and seals the discharging orifice 12 and the pressure relief orifice 11. The cover plate 4 is disposed on the bottom plate 1 and covers the gas pressure sensor 2 and the thin gas transportation device 3, so that the gas pressure sensor 2 and the thin gas transportation device 3 are accommodated between the bottom plate 1 and the cover plate 4. The cover plate 4 includes an intake orifice 41. The intake orifice 41 is correspondingly arranged with the gas pressure sensor 2. In the embodiment, preferably but not exclusively, the intake orifice 41 is correspondingly located above the gas pressure sensor 2. The thin gas transportation device 3 is driven to inhale gas into the cover plate 4 through the intake orifice 41, the gas is then discharged through the discharging orifice 12 by the thin gas transportation device 3, and a pressure change of the gas is sensed by the gas pressure sensor 2.

Figure 2:
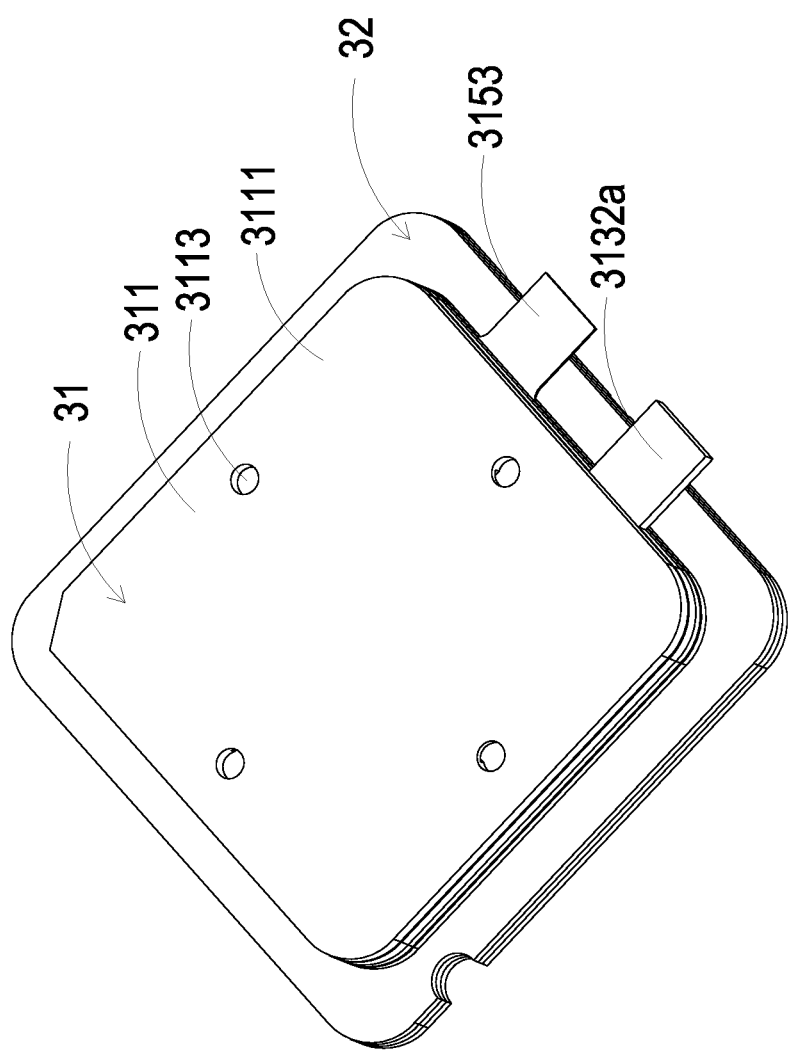
FIG. 2 is a schematic view illustrating the thin gas transportation device according to the embodiment of the present disclosure.

Please refer to FIG. 2. In the embodiment, the thin gas transportation device 3 includes a thin gas pump 31 and a thin valve structure 32. The thin gas pump 31 is stacked on the thin valve structure 32.

Figure 3A:
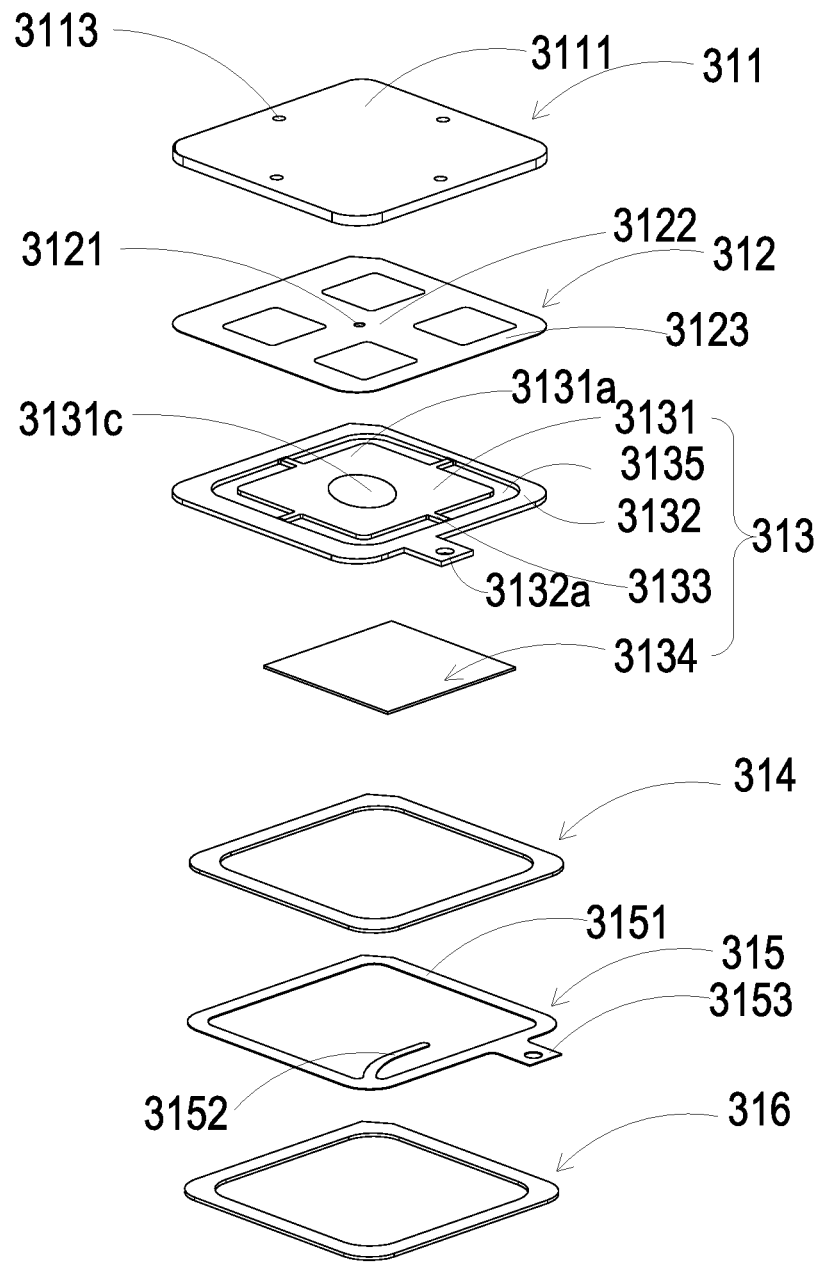
FIG. 3A is an exploded view illustrating the thin gas pump according to the embodiment of the present disclosure.
Figure 3B:
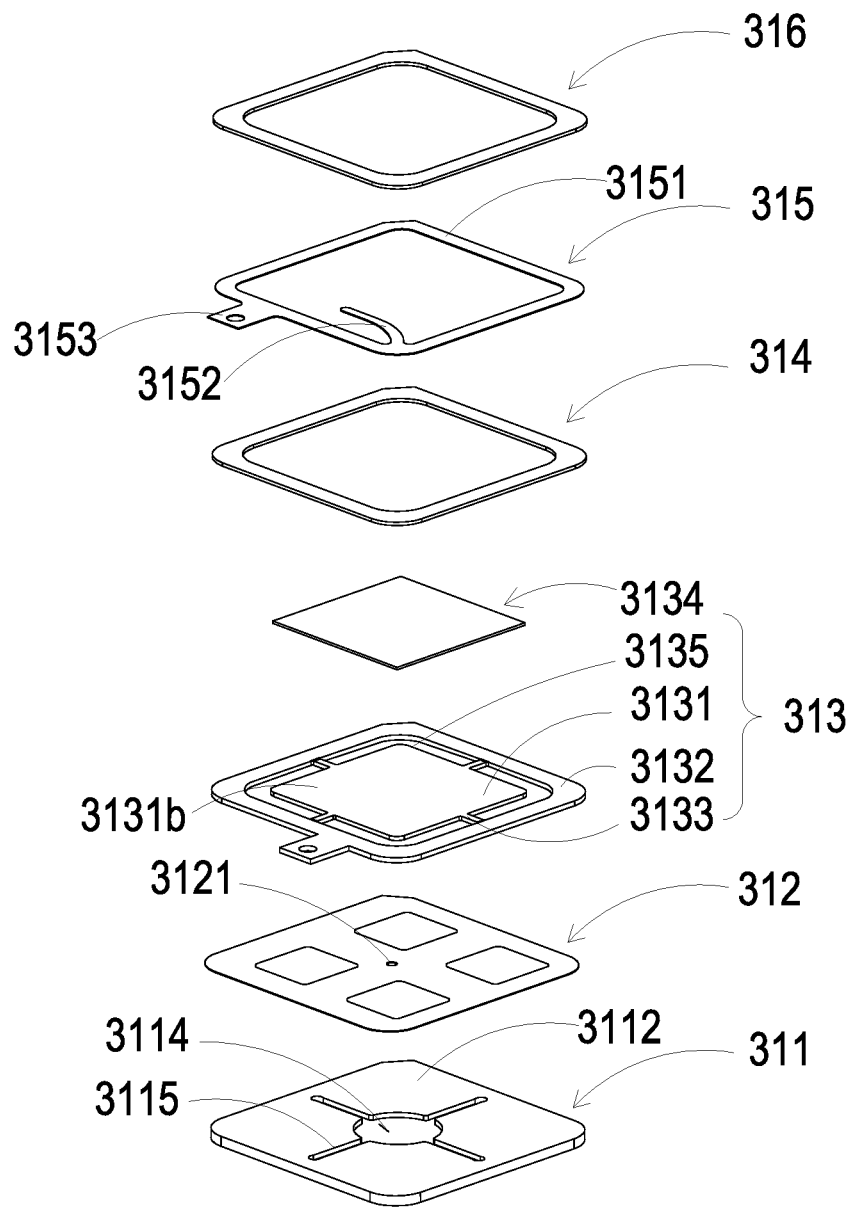
FIG. 3B is an exploded view illustrating the thin gas pump according to the embodiment of the present disclosure and taken from a different perspective.

Please refer to FIG. 3A and FIG. 3B. In the embodiment, the thin gas pump 31 includes an inlet plate 311, a resonance plate 312, an actuation element 313, a first insulation frame 314, a conducting frame 315, and a second insulation frame 316. The inlet plate 311 includes a first surface 3111, a second surface 3112, a plurality of inlet apertures 3113, a convergence chamber 3114 and a plurality of intake channels 3115. The first surface 3111 and the second surface 3112 are two surfaces opposed to each other. In the embodiment, preferably but not exclusively, the number of the plurality of inlet apertures 3113 is exemplified by four, but not limited thereto. Each one of the plurality of inlet apertures 3113 penetrates from the first surface 3111 to the second surface 3112. The convergence chamber 3114 is recessed from the second surface 3112 and located at a center of the second surface 3112. The number and the position of the plurality of intake channels 3115 are corresponding to those of the plurality inlet apertures 3113. In the embodiment, preferably but not exclusively, the number of the plurality of intake channels 3115 is exemplified by four. Each of the plurality of intake channels 3115 is recessed from the second surface and includes a first end in fluid communication with the corresponding inlet aperture 3113 and a second end in fluid communication with the convergence chamber 3114. In that, when the gas is inhaled through the inlet apertures 3113, respectively, the gas flows through the corresponding intake channel 3115, and is finally converged in the convergence chamber 3114.

In the embodiment, the resonance plate 312 is connected to the second surface 3112 of the inlet plate 311. The resonance plate 312 includes a central aperture 3121, a vibration part 3122 and a fixed part 3123. The central aperture 3121 is located at a center position of the resonance plate 312 and penetrated therethrough. The vibration part 3122 surrounds the central aperture 3121 and is located at a peripheral area around the central aperture 3121. The fixed part 3123 surrounds the vibration part 3122 and is located at the periphery of the vibration part 3122. The resonance plate 312 is connected to the inlet plate 311 through the fixed part 3123. In the embodiment, when the resonance plate 312 is connected to the inlet plate 311, the central aperture 3121 and the vibration part 3122 are vertically corresponding to the convergence chamber 3114 of the inlet plate 311.

In the embodiment, the actuator 313 is connected to the fixed part 3123 of the resonance plate 312. The actuation element 313 includes a vibration plate 3131, an outer frame 3132, a plurality of connection parts 3133, a piezoelectric plate 3134 and a plurality of gas passages 3135. The vibration plate 3131 is a square structure. The outer frame 3132 is a square frame surrounding the periphery of the vibration plate 3131 and has a first conductive pin 3132a. The first conductive pin 3132a is extended from the periphery of the frame 3132 in a horizontal direction. The plurality of gas passages 3135 are formed between the vibration plate 3131, the outer frame 3132 and the plurality of connection parts 3133. In the embodiment, the actuation element 313 is connected to the fixed part 3123 of the resonance plate 312 through the outer frame 3132. In the embodiment, preferably but not exclusively, the number of the plurality of connection parts 3133 is exemplified by four. The plurality of connection parts 3133 are connected between the vibration plate 3131 and the outer frame 3132, respectively, for elastically supporting the vibration plate 3131. The shape and the area of the piezoelectric plate 3134 are corresponding to those of the vibration plate 3131. Preferably but not exclusively, the piezoelectric plate 3134 has a side length less than or equal to that of the vibration plate 3131, and is attached to the vibration plate 3131. In addition, the vibration plate 3131 has two opposite surfaces, which are an upper surface 3131a and a lower surface 3131b. The upper surface 3131a has a convex portion 3131c, and the piezoelectric plate 3134 is attached to the lower surface 3131b.

The profiles of the first insulation frame 314 and the second insulation frame 316 are the same as the frame 3132 of the actuation element 313, and both are square frames. The conducting frame 315 includes a frame portion 3151, an electrode portion 3152 and a second conductive pin 3153. The frame portion 3151 has the same shape as the first insulation frame 314 and the second insulation frame 316 and is a square frame. The electrode portion 3152 is extended from the inner side of the frame portion of 3151 toward the center, and the second conductive pin 3153 is extended horizontally from the outer periphery of the frame portion 315. In the embodiment, the first insulation frame 314 is connected to the actuation element 313, the conducting frame 315 is connected to the first insulation frame 314, and the second insulation frame 316 is connected to the conducting frame 315.

Figure 4A:
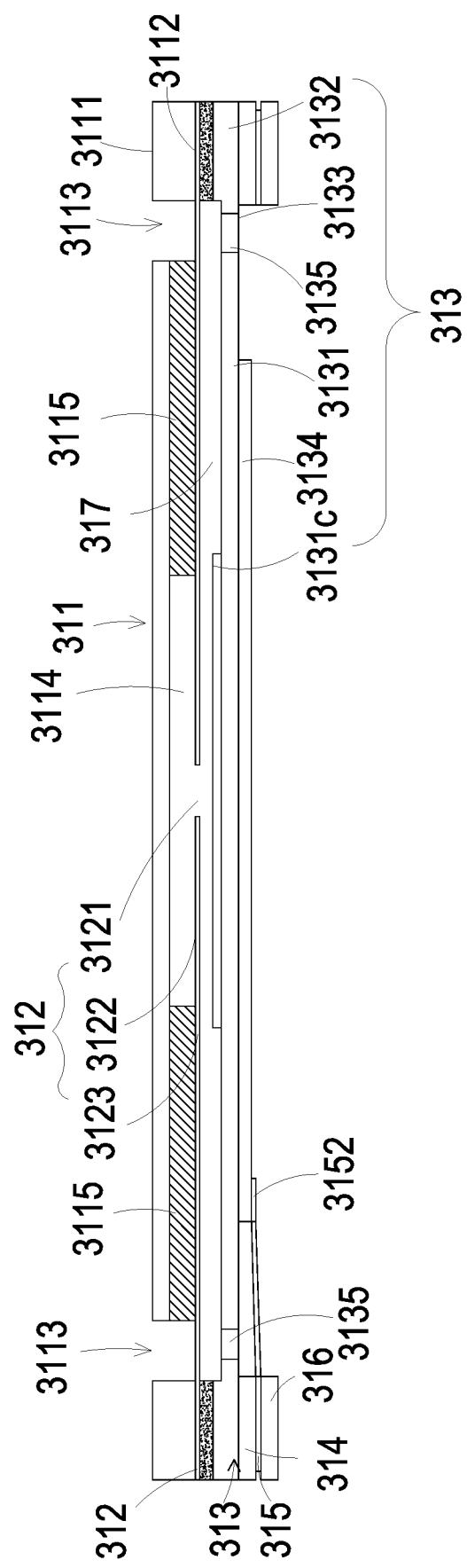
FIG. 4A is a schematic cross-sectional view illustrating the thin gas pump according to the embodiment of the present disclosure.

Please refer to FIGS. 4A and 3A. FIG. 4A is a schematic cross-sectional view illustrating the thin gas pump according to the embodiment of the present disclosure. The inlet plate 311, the resonance plate 312, the actuation element 313, the first insulation frame 314, the conducting frame 315 and the second insulation frame 316 are stacked sequentially, and a vibration chamber 317 is formed between the resonance plate 312 and the vibration plate 3131. In addition, the electrode portion 3152 of the conducting frame 315 is in contact with the piezoelectric plate 3134 of the actuation element 313 and electrically connected therewith, so that the first conductive pin 3132a of the actuation element 313 and the second conductive pin 3153 of the conducting frame 315 are externally connected to receive the driving signal, such as the driving voltage and the driving frequency and transmit the driving signal to the piezoelectric plate 3134.

Figure 4B:
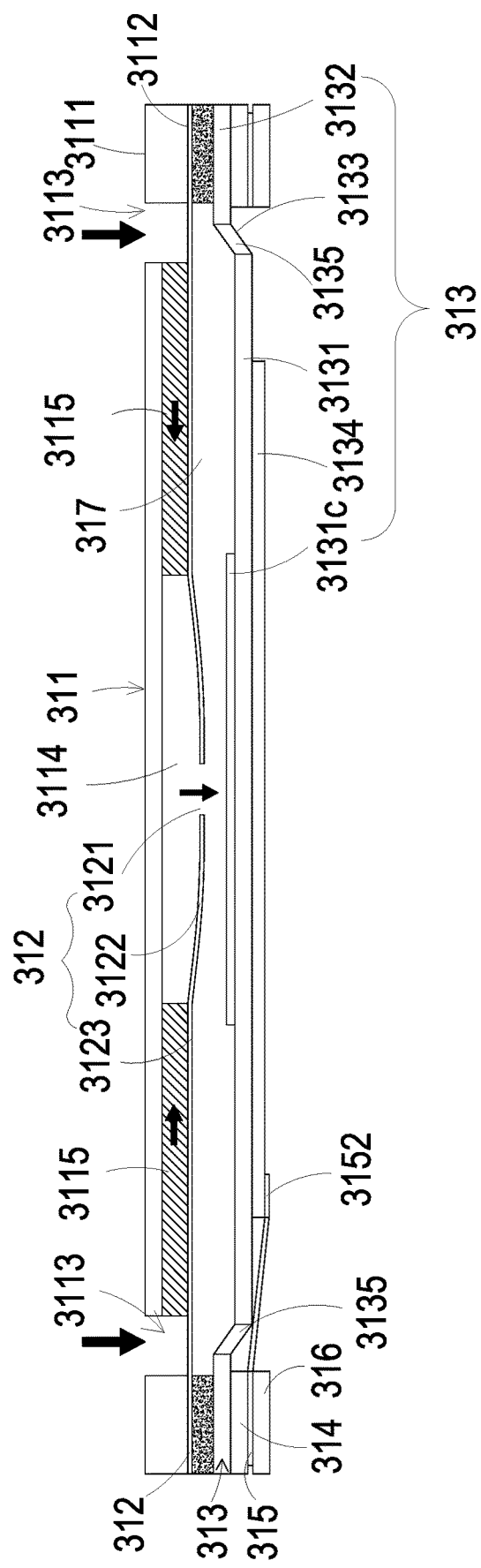
FIGS. 4B to 4D are schematic cross-sectional views illustrating actions of the thin gas pump of the present disclosure.
Figure 4C:
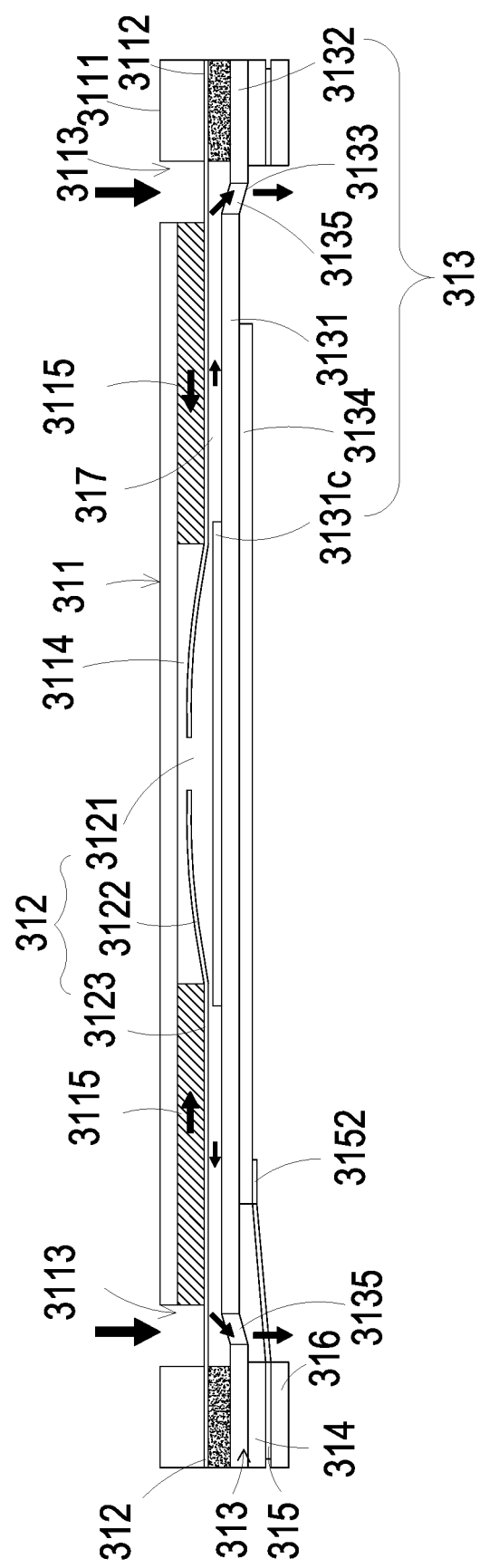
Figure 4D:
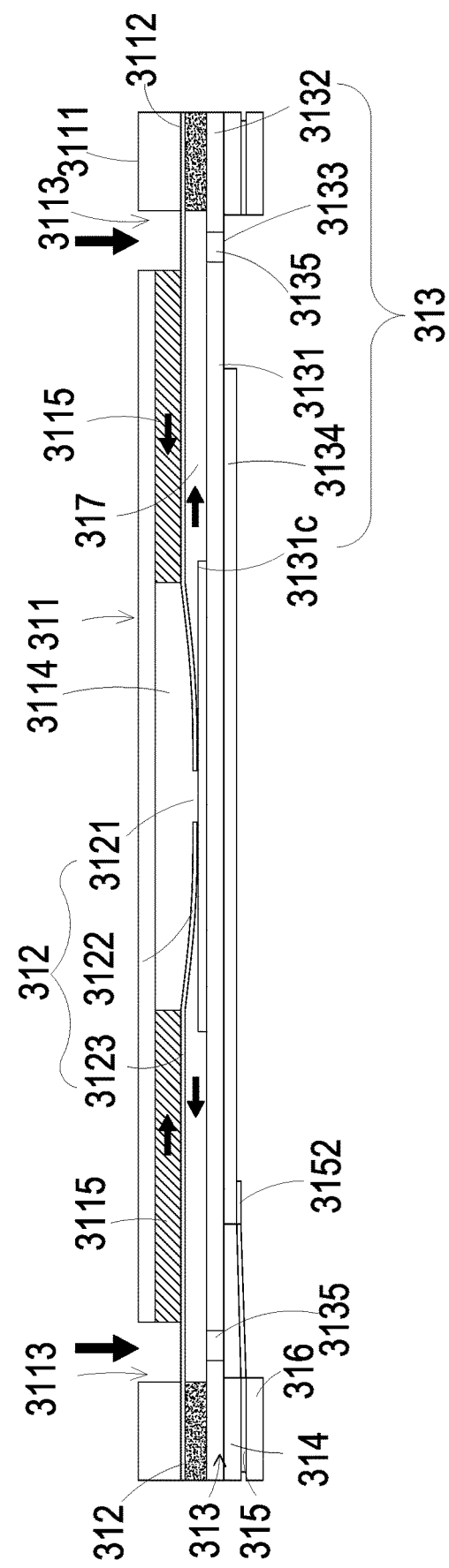

FIGS. 4B to 4D are schematic cross-sectional views illustrating actions of the thin gas pump 31. When the piezoelectric plate 3134 receives the driving signal, the piezoelectric plate 314 is deformed due to the piezoelectric effect, and the vibration plate 3131 is driven to displace upwardly and downwardly. Please refer to FIG. 4B firstly. When the vibration plate 3131 is displaced downwardly, the vibration part 3122 of the resonance plate 312 is driven to move downwardly, so that the volume of the convergence chamber 3114 is increased, and the gas outside is inhaled into the convergence chamber 314 through the inlet apertures 3113 and the intake channels 3115. As shown in FIG. 4C, when the vibration plate 3131 is driven to displace upwardly by the piezoelectric plate 3134, the gas in the vibration chamber 317 is pushed from the center to the periphery and transported to the intake channels 3135, so that the gas flows downwardly through the intake channels 3135. At the same time, the resonance plate 312 is moved upwardly, and the gas in the convergence chamber 3114 is transported downwardly through the central aperture 3121. Finally, as shown in FIG. 4D, when the vibration plate 3131 is displaced downwardly and back to the original position, the vibration part 3122 of the resonance plate 312 is driven synchronously to move downwardly, and the vibration part 3122 approaches the convex portion 3131c of the vibration plate 3131. In that, the gas in the vibration chamber 317 is transported outwardly to flow through the intake channels 3135. Moreover, since the vibration part 3122 is displaced downwardly, the volume of the convergence chamber 3114 is greatly increased, and then the gas is inhaled from the outside through the inlet apertures 3113 and the intake channels 3115 and flows into the convergence chamber 3114. By repeating the actions shown in the above continuously, the gas is continuously transported downwardly to the thin valve structure 32.

Figure 5A:
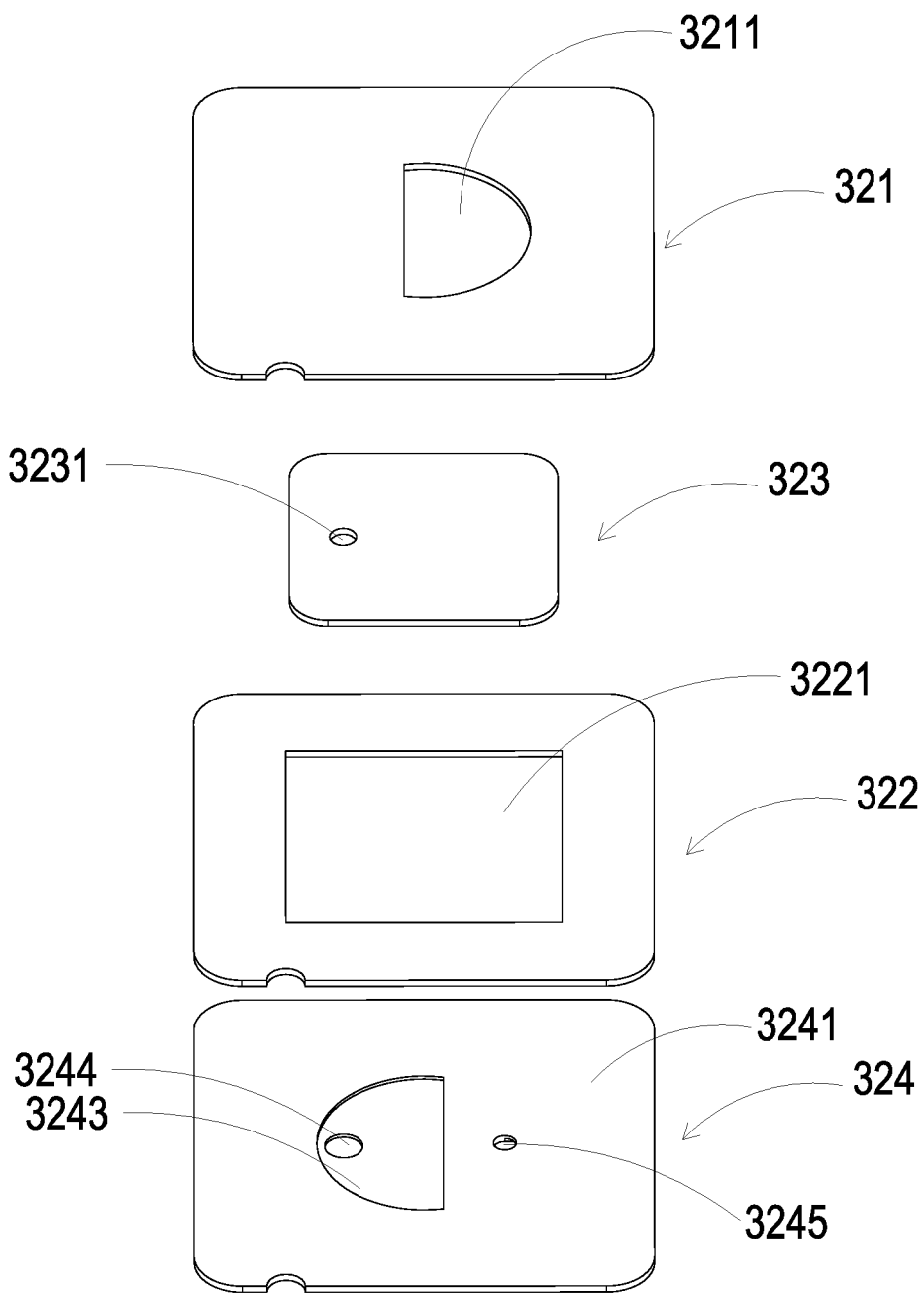
FIG. 5A is an exploded view illustrating the thin valve structure according to the embodiment of the present disclosure.
Figure 5B:
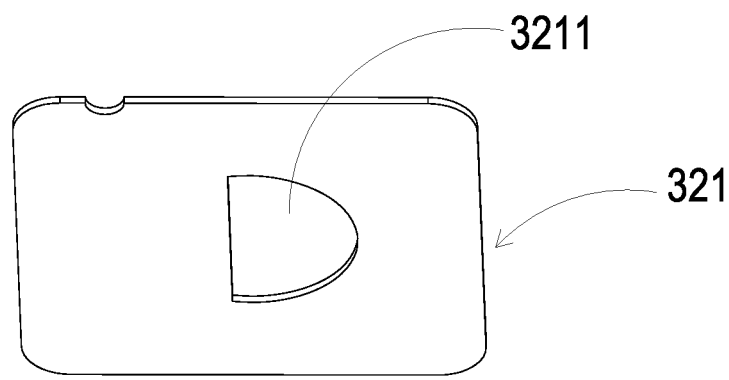
FIG. 5B is an exploded view illustrating the thin valve structure according to the embodiment of the present disclosure and taken from a different perspective.
Figure 5B:
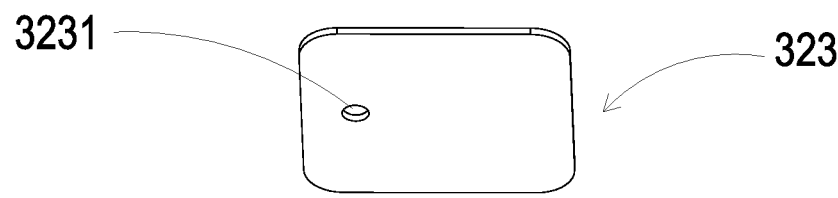
Figure 5B:
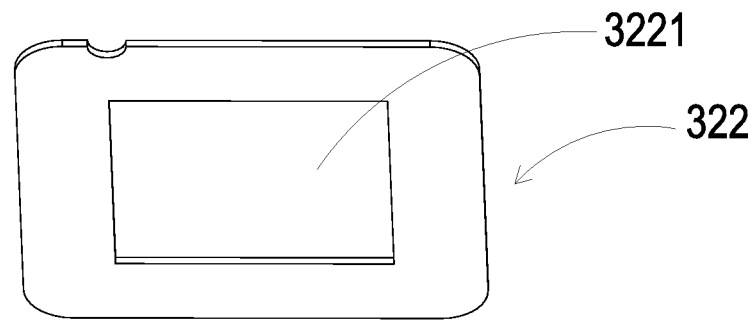
Figure 5B:
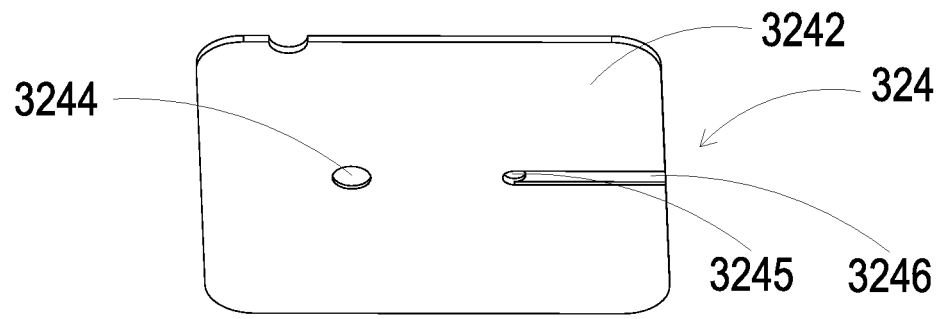

Please refer to FIGS. 5A to 5B. FIG. 5A is an exploded view illustrating the thin valve structure according to the embodiment of the present disclosure. FIG. 5B is an exploded view illustrating the thin valve structure according to the embodiment of the present disclosure and taken from a different perspective. The thin valve structure 32 includes a first thin plate 321, a valve frame 322, a valve plate 323 and a second plate 324.

In the embodiment, the first thin plate 321 includes a hollowed region 3211. The valve frame 322 includes a valve-plate-accommodation region 3221. The valve plate 332 is disposed in the valve-plate-accommodation region 3221 and includes a valve aperture 3231. The valve aperture 3231 is misaligned with the hollowed region 3211. Preferably but not exclusively, the shape of the valve-plate-accommodation region 3221 is the same as the shape of the valve plate 323 for fixing and positioning the valve plate 323.

In the embodiment, the second thin plate 324 includes an outgassing surface 3241, a pressure relief surface 3242, an outlet groove 3243, an outlet aperture 3244, a pressure relief aperture 3245 and a pressure relief groove 3246. The outgassing surface 3241 and the pressure relief surface 3242 are two surfaces opposed to each other. The outlet groove 3243 is recessed from the outgassing surface 3241 and partially misaligned with the hollowed region 3211 of the first thin plate 321. The outlet aperture 3244 is hollowed out from the outgassing surface 3241 toward the pressure relief surface 3242. The outlet aperture 3244 is corresponding in position to the valve aperture 3231 of the valve plate 323. In addition, the outlet aperture 3244 has a diameter greater than that of the valve aperture 3231. The pressure relief aperture 3245 is spaced apart from the outlet groove 3243. The pressure relief groove 3246 is recessed from the pressure relief surface 3242 and includes an end in fluid communication with the pressure relief aperture 3245 and another end extended to the edge of the second thin plate 324. In the embodiment, preferably but not exclusively, the outlet groove 3243 of the second thin plate 324 and the hollowed region 3211 of the first thin plate 321 are in an identical shape and corresponding to each other.

In the embodiment, the first thin plate 321, the valve frame 322 and the second thin plate 324 are made of a metal material. In an embodiment, preferably but not exclusively, the first thin plate 321, the valve frame 322 and the second thin plate 324 are made of the same metal material, such as the stainless steel material.

Figure 6A:
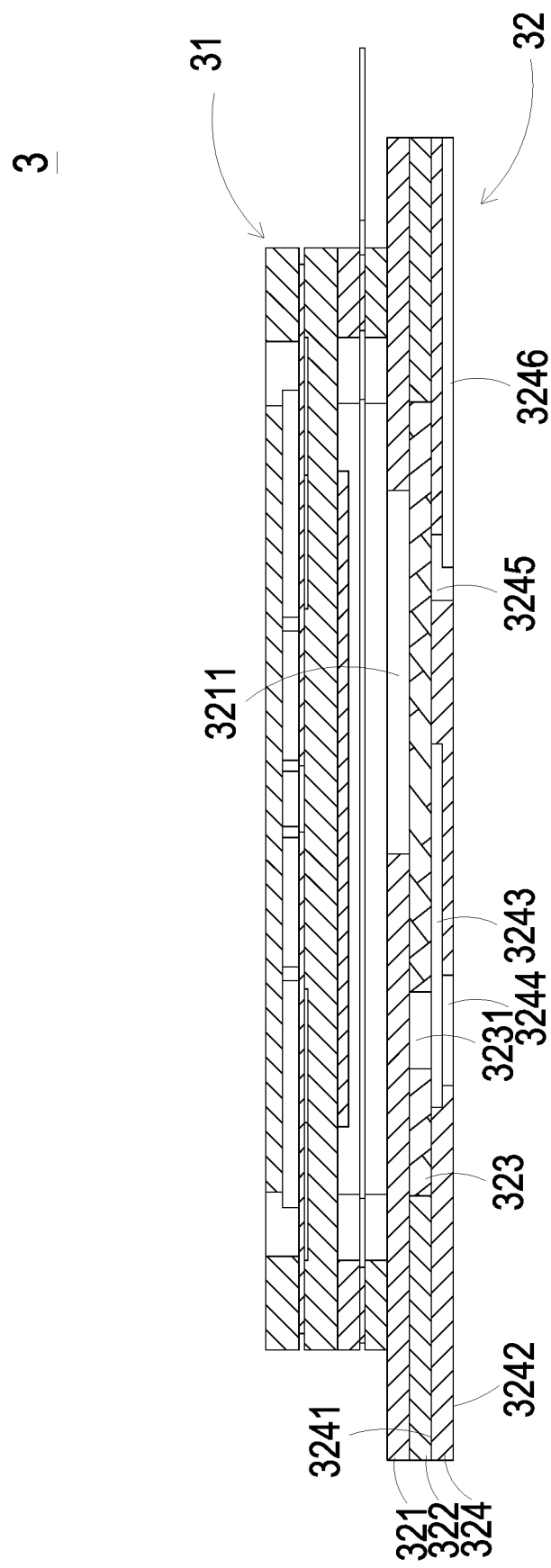
FIG. 6A is a schematic cross-sectional view illustrating the thin gas transportation device according to the embodiment of the present disclosure.
Figure 6B:
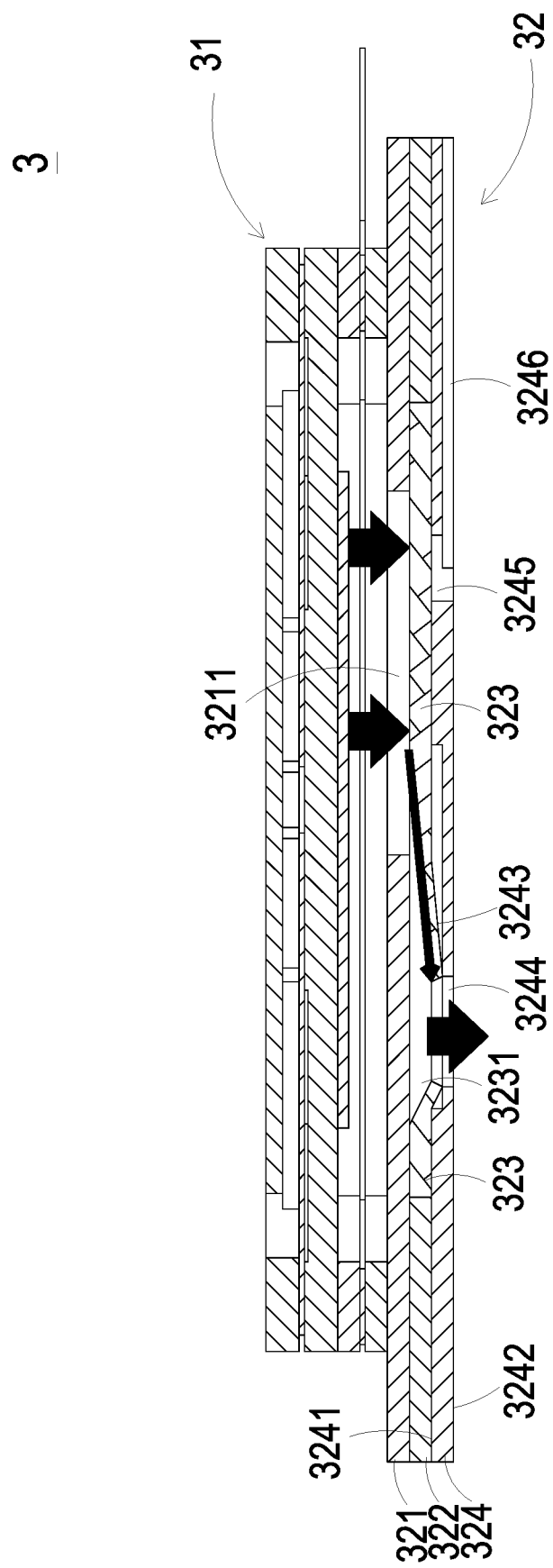
FIG. 6B is a schematic cross-sectional view illustrating a gas discharging action of the thin gas transportation device according to the embodiment of the present disclosure.
Figure 6C:
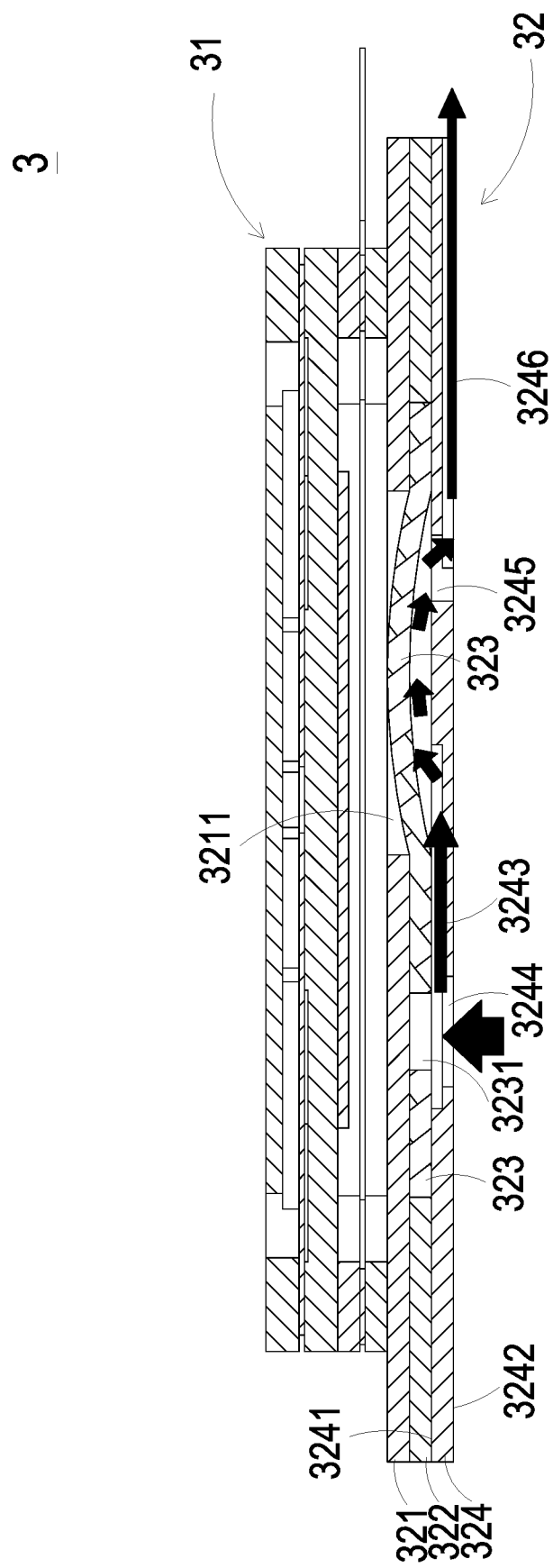
FIG. 6C is a schematic cross-sectional view illustrating a pressure relief action of the thin gas transportation device according to the embodiment of the present disclosure.

Please refer to FIG. 6A. FIG. 6A is a schematic cross-sectional view illustrating the thin gas transportation device according to the embodiment of the present disclosure. The first thin plate 321, the valve plate 322 and the second thin plate 324 of the thin valve structure 32 are stacked and fixed sequentially. The valve plate 323 is accommodated within the valve-plate-accommodation region 3221 of the valve frame 322. The thin valve structure 32 is connected to the second insulation frame 316, so that the thin gas pump 31 is stacked on the thin valve structure 32. When the gas is transported to the thin valve structure 32 by the thin gas pump 31, as shown in FIG. 6B, the gas flows into the hollowed region 3211 of the first thin plate 321 to push the valve plate 323. In that, a part of the valve plate 323 located above the outlet groove 3243 is pushed downwardly, and the gas flows into the outlet groove 3243, and is discharged through the valve aperture 3231 and the outlet aperture 3244 of the second thin plate 324. FIG. 6C is a schematic cross-sectional view illustrating the thin valve structure 32 performing the pressure relief action. When the thin gas transportation device 3 stops transporting the gas, the pressure relief action starts through the thin valve structure 32. As shown in FIG. 6C, the gas is transported from the outlet aperture 3244 to the second thin plate 324, and pushes the valve plate 323 upwardly at the same time. In that, the valve aperture 3231 of the valve plate 323 abuts and seals against the first thin plate 321. Moreover, one part of the valve plate 323 located above the hollowed region 3211 of the first thin plate 321 is pushed upwardly, and the gas flows from the outlet groove 3243 into the hollowed region 3211. The gas is discharged through the pressure relief aperture 3245 and the pressure relief groove 3246 to achieve the pressure relief action.

Figure 7A:
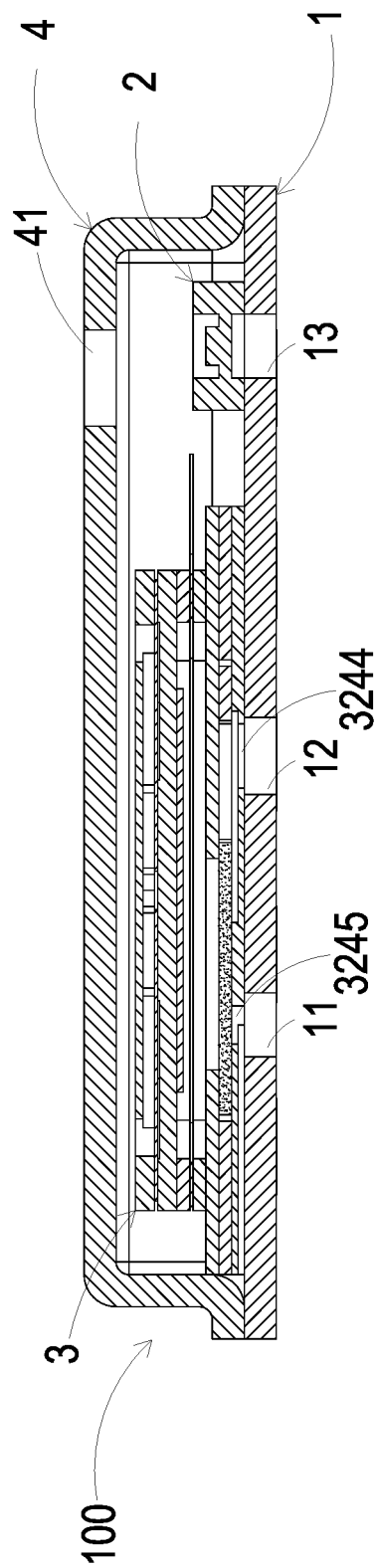
FIG. 7A is a schematic cross-sectional view illustrating the actuating and sensing module according to the embodiment of the present disclosure.
Figure 7B:
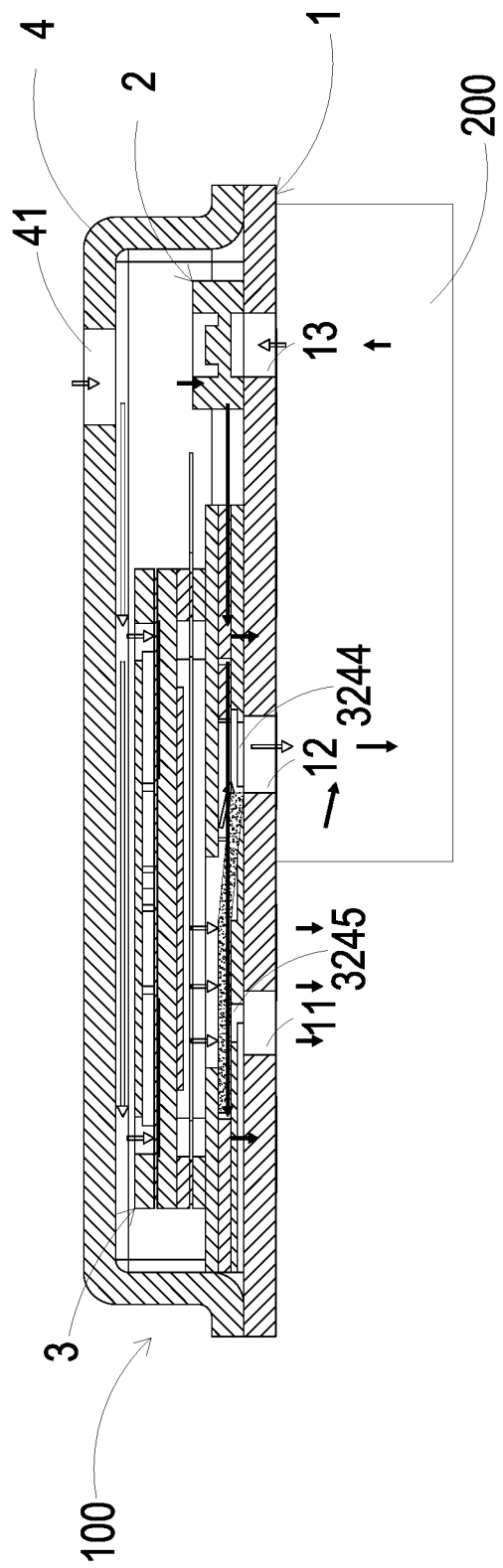
FIG. 7B is a schematic cross-sectional view illustrating an inflation of the actuating and sensing module connected with a positive pressure load according to the embodiment of the present disclosure.
Figure 7C:
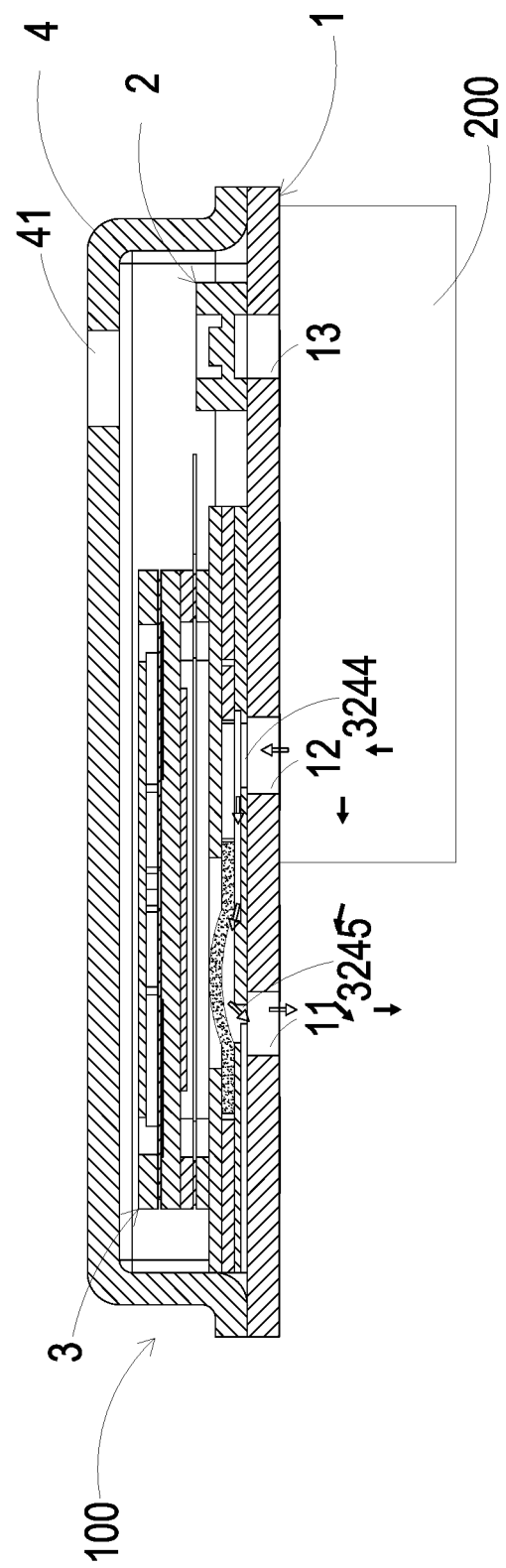
FIG. 7C is a schematic cross-sectional view illustrating a pressure relief action of the actuating and sensing module connected with a positive pressure load according to the embodiment of the present disclosure.

Please refer to FIG. 7A. In the embodiment, the outlet aperture 3244 of the thin gas transportation device 3 is in fluid communication with the discharging orifice 12 of the bottom plate 1. Moreover, the pressure relief aperture 3245 is in fluid communication with the pressure relief orifice 11 of the bottom plate 1. Please refer to FIG. 7B. In the embodiment, the actuating and sensing module 100 of the present disclosure is connected with a positive pressure load 200. The positive pressure load 200 is in fluid communication with the discharging orifice 12 and the communication orifice 13 of the bottom plate 1. When the thin gas transportation device 3 is actuated, the gas is transported to the positive pressure load 200 through the outlet aperture 3244 and the discharging orifice 12, so as to achieve an inflation action of the positive pressure load 200. The pressure value of the positive pressure load 200 is obtained from the pressure sensor 2 on the communication orifice 13, so as to regulate the thin gas transportation device 3. Please refer to FIG. 7C again. When the positive pressure load 200 needs to perform the pressure relief action, the thin gas transportation device 3 stops the operation, the thin valve structure 32 thereof performs the pressure relief action, and the gas is discharged through the discharging orifice 12.

Figure 7D:
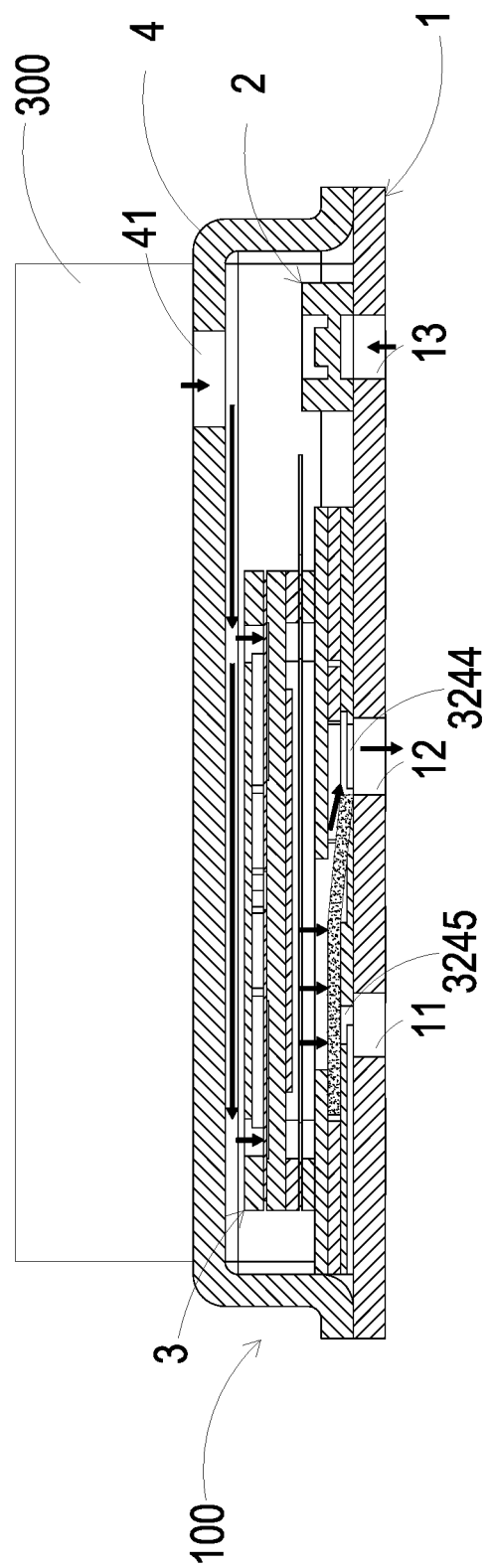
FIG. 7D is a schematic cross-sectional view illustrating an inflation of the actuating and sensing module connected with a negative pressure load according to the embodiment of the present disclosure.
Figure 7E:
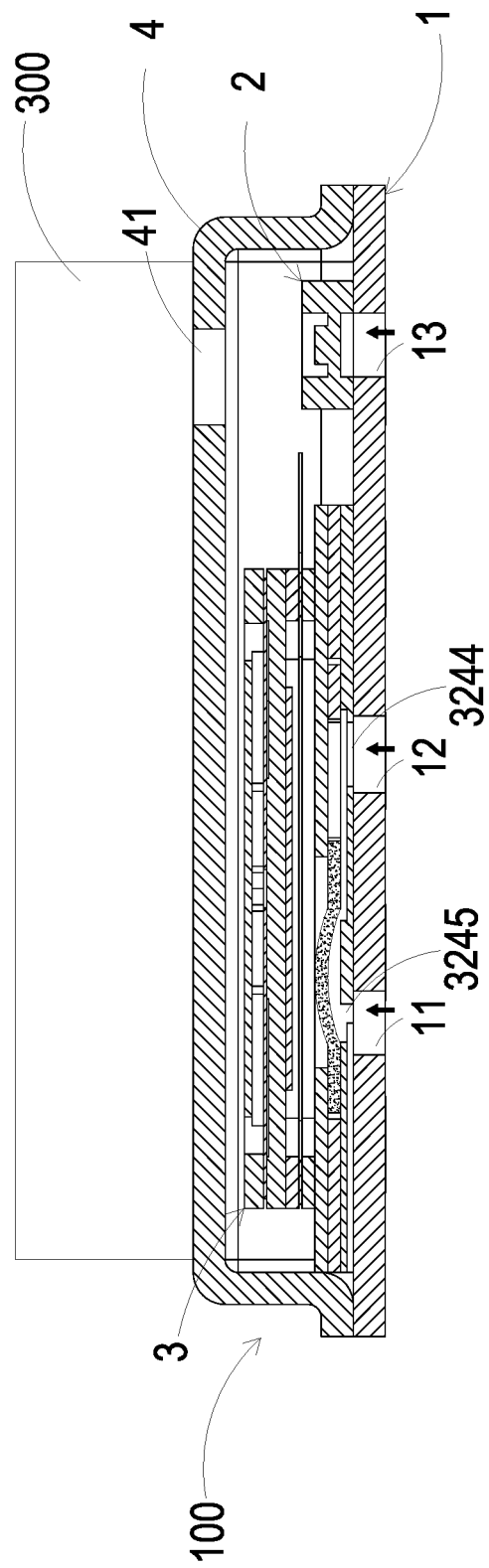
FIG. 7E is a schematic cross-sectional view illustrating a pressure relief action of the actuating and sensing module connected with a negative pressure load according to the embodiment of the present disclosure.

Please refer to FIG. 7D. In the embodiment, the actuating and sensing module 100 of the present disclosure is connected with a negative pressure load 300, and the negative pressure load 300 is in fluid communication with the intake orifice 41 of the cover plate 4. When the thin gas transportation device 3 is actuated, the gas is inhaled from the negative pressure load 300, and then discharged through the discharging orifice 12. The gas flowing into the actuating and sensing module 100 is sensed to obtain the gas pressure value by the gas pressure sensor 2, so as to regulate the thin gas transportation device 3. Moreover, when the thin gas transportation device 3 stops running, as shown in FIG. 7E, the pressure relief action is performed through the thin valve structure 32 and prevents the gas from backflow.

In the embodiment, the positive pressure load 200 and the negative pressure load 300 are one selected form the group consisting of an air bag, a gas bag, a gas cylinder and a gas tank, which can be filled with gas.

In the embodiment, preferably but not exclusively, the actuating and sensing module 100 of the present disclosure is a standard modular IC. In an embodiment, the bottom plate 1 and the cover plate 4 can be used as the housing of the IC-packaged plates, and the thin gas transportation device 3 is embedded therein as the IC is packaged. Notably, in the embodiment, preferably but not exclusively, the actuating and sensing module 100 of the present disclosure is an IC chip, which has a length less than 18 mm, a width less than 16 mm, and a thickness less than 4 mm.

In summary, the present disclosure provides an actuating and sensing module, which is applicable for a positive pressure load or a negative pressure load, such as an air bag or a gas cylinder. The positive pressure load and the negative pressure load can be detected by the gas pressure sensor to further regulate the thin gas transportation device.

While the disclosure has been described in terms of the most practical and preferred embodiments, it is to be understood that the disclosure needs not be limited to the disclosed embodiments. On the contrary, it is intended to cover various modifications and similar arrangements included within the spirit and scope of the appended claims so as to encompass all such modifications and similar structures.

What is claimed is:

1. An actuating and sensing module comprising:
   a bottom plate comprising a pressure relief orifice, a discharging orifice and a communication orifice;
   a gas pressure sensor disposed on the bottom plate and sealing the communication orifice;
   a thin gas transportation device disposed on the bottom plate and sealing the discharging orifice and the pressure relief orifice; and
   a cover plate disposed on the bottom plate and covering the gas pressure sensor and the thin gas-transportation device, wherein the cover plate comprises an intake orifice;
   wherein the thin gas transportation device is driven to inhale gas through the intake orifice, the gas is then discharged through the discharging orifice by the thin gas transportation device, and a pressure change of the gas is sensed by the gas pressure sensor.

2. The actuating and sensing module according to claim 1, wherein the intake orifice is correspondingly arranged with the gas pressure sensor.

3. The actuating and sensing module according to claim 1, wherein the discharging orifice is in fluid communication with a positive pressure load.

4. The actuating and sensing module according to claim 3, wherein the positive pressure load is an air bag.

5. The actuating and sensing module according to claim 3, wherein the positive pressure load is a gas cylinder.

6. The actuating and sensing module according to claim 1, wherein the intake orifice is in fluid communication with a negative pressure load.

7. The actuating and sensing module according to claim 6, wherein the negative pressure load is an air bag.

8. The actuating and sensing module according to claim 6, wherein the negative pressure load is a gas cylinder.

9. The actuating and sensing module according to claim 1, wherein the thin gas transportation device comprises:
   a thin gas pump comprising:
      an inlet plate comprising a first surface, a second surface opposed to the first surface, a plurality of inlet apertures, a plurality of intake channels and a convergence chamber, wherein each one of the plurality of inlet apertures penetrates from the first surface to the second surface, the convergence chamber is recessed from the second surface and located at a center of the second surface, and each of the plurality of intake channels is recessed from the second surface and comprises a first end in fluid communication with the corresponding inlet aperture and a second end in fluid communication with the convergence chamber;
      a resonance plate connected to the second surface and comprising a central aperture, a vibration part and a fixed part, wherein the central aperture is located at a center position of the resonance plate, the vibration part surrounds the central aperture and corresponds to the convergence chamber, and the fixed part surrounds the vibration part, wherein the resonance plate is connected to the inlet plate through the fixed part;
      an actuation element connected to the fixed part of the resonance plate;
      a first insulation frame connected to the actuation element;
      a conducting frame connected to the first insulation frame; and
      a second insulation frame connected to the conducting frame; and
   a thin valve structure connected to the second insulation frame and comprising:
      a first thin plate comprising a hollowed region;
      a valve frame comprising a valve-plate-accommodation region;
      a valve plate disposed in the valve-plate-accommodation region and comprising a valve aperture, wherein the valve aperture is misaligned with the hollowed region; and
      a second thin plate comprising an outgassing surface, a pressure relief surface opposed to the outgassing surface, an outlet groove, an outlet aperture, a pressure relief aperture and a pressure relief groove, wherein the outlet groove is recessed from the outgassing surface and partially misaligned with the hollowed region of the first thin plate, the outlet aperture is hollowed out from the outgassing surface toward the pressure relief surface, and is corresponding to the valve aperture, the pressure relief aperture is spaced apart from the outlet groove, and the pressure relief groove is recessed from the pressure relief surface and in fluid communication with the pressure relief aperture;

wherein the first thin plate, the valve plate and the second thin plate are stacked and fixed sequentially.

10. The actuating and sensing module according to claim 9, wherein the actuation element comprises:
a vibration plate being a square structure;
an outer frame arranged around the vibration plate;
a plurality of connection components connected between the vibration plate and the outer frame, respectively, for elastically supporting the vibration plate; and
a piezoelectric plate with a shape and an area corresponding to the vibration plate and attached to the vibration plate.

11. The actuating and sensing module according to claim 9, wherein the outlet aperture has a diameter greater than that of the valve aperture.

12. The actuating and sensing module according to claim 9, wherein the first thin plate, the valve frame and the second thin plate are made of a metal material.

13. The actuating and sensing module according to claim 12, wherein the metal material is a stainless steel material.

14. The actuating and sensing module according to claim 9, wherein the hollowed region and the outlet groove are in an identical shape.

15. The actuating and sensing module according to claim 1, wherein the actuating and sensing module has a length less than 18 mm, a width less than 16 mm, and a thickness less than 4 mm.

* * * * *